May 14, 1968
C. M. WALKER
3,382,898
CHAIN SAW ATTACHMENT
Filed May 16, 1966
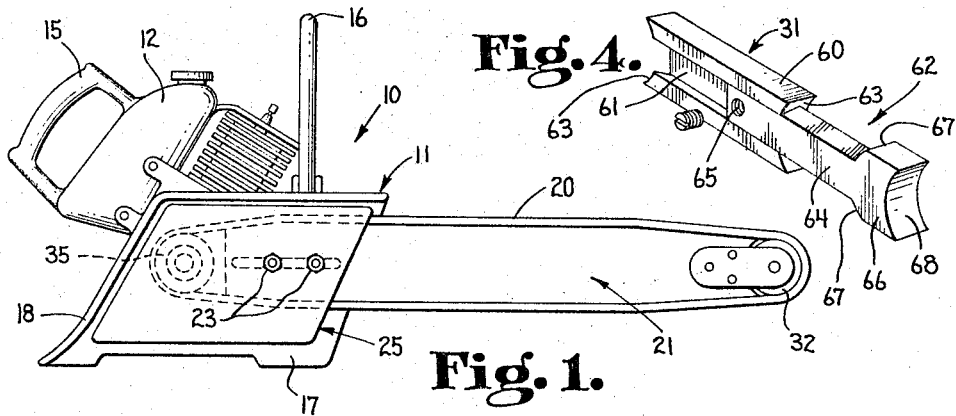
Fig. 1.
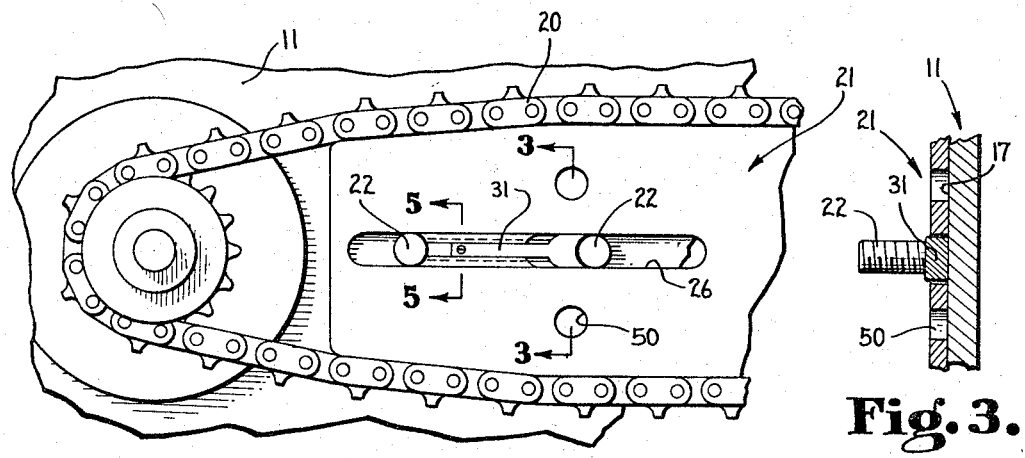
Fig. 2.
Fig. 3.
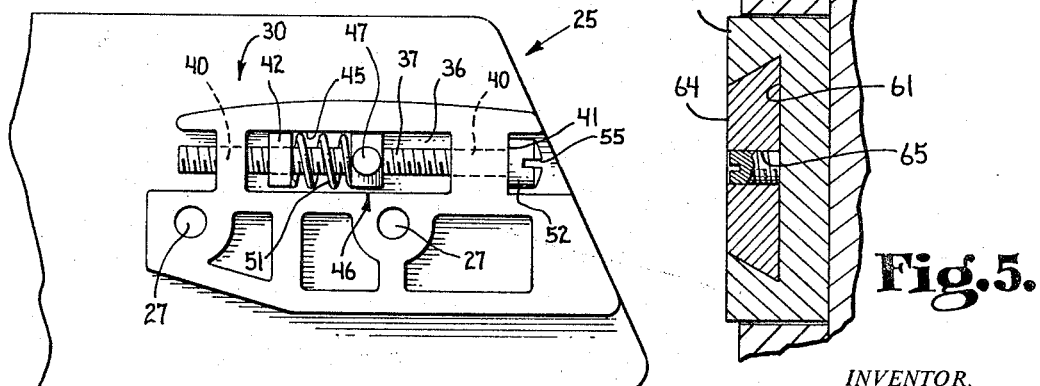
Fig. 6.
Fig. 5.
INVENTOR.
CHARLES M. WALKER
BY
Woodard, Weikart, Emhardt & Naughton
Attorneys

United States Patent Office 3,382,898
Patented May 14, 1968

3,382,898
CHAIN SAW ATTACHMENT
Charles M. Walker, Rte. 1, Greensburg, Ind. 47240
Filed May 16, 1966, Ser. No. 550,339
4 Claims. (Cl. 143—32)

The present invention relates to chain saws and more particularly relates to an improved means for setting and maintaining a desired chain tension during the operation of the chain saw.

One of the common problems encountered in the construction and operation of chain saws is the fact that the chain tension must be repeatedly readjusted while the saw is being used. In conventional saws, this readjustment is a relatively complicated operation. Nuts, which secure the chain mounting blade or bar to the frame, must be released, the position of the blade adjusted and the nuts retightened with the blade in the proper position.

Various solutions to this problem have been proposed. One prior art device facilitates resetting the desired, predetermined chain tension by providing a sleeve which is twisted to reset the blade position. While this provided a substantial step forward in the art, it was not automatic.

Another relatively recent improvement in chain saws is the use of a pulley at the distal end of the blade to reduce friction and to facilitate the travel of the chain on the blade. However, this improvement has not been widely accepted as the chain derails or dismounts when it is loose.

One of the most recent advances in the art is disclosed in my U.S. Patent 3,194,284, wherein the tension maintaining means is usable in a chain saw having an endless toothed chain, a frame, a drive sprocket rotatably mounted on the frame and supporting the chain, and a blade reciprocably mounted on the frame and supporting the chain. The chain tension is maintained by a spring means acting between the blade and the frame and resiliently urging the blade against the chain to maintain the chain taut. An adjustment means allows the chain to be set at a desired value. However, unlike the prior art devices, once the chain has been set to the desired value, the spring means automatically maintains this value throughout the use of the chain saw and until such time as the user resets the chain for another operation.

The present invention provides an improved spring means for automatically maintaining the chain tension. The improvement comprises means for adjusting the length of the tension maintaining means so that a single unit is usable in a number of chain saws of varying size and by varying manufacturers.

Therefore, it is an object of the present invention to provide an improved means for adjusting the tension of the chain in a chain saw.

Another object of the present invention is to provide an improved means for adjusting the tension of the chain wherein the improved means is adjustable so as to be usable in a number of chain saws of varying makes and sizes.

It is a further object of the present invention to provide an improved chain saw which maintains the chain at the proper tautness for a longer period of time than the prior art chain saws.

Related objects and advantages will become apparent as the description proceeds.

One embodiment of the present invention might include a spacer bar as disclosed in my U.S. Patent 3,194,-284, the improvement thereover comprising a first element slidably mounted in a second element so as to be movable along a longitudinal axis thereof, thereby providing a tension maintaining means which may be adjusted to a number of varying lengths.

The full nature of the invention will be understood from the accompanying drawings and the following description and claims.

In the drawings:
FIG. 1 is a side elevation of a chain saw embodying the present invention;
FIG. 2 is an enlarged view similar to FIG. 1 with the cover or cover plate of the chain saw removed;
FIG. 3 is a fragmentary section taken along the line 3—3 of FIG. 2 in the direction of the arrows;
FIG. 4 is a perspective view of the spacer of the present invention;
FIG. 5 is a fragmentary view taken along the line 5—5 of FIG. 2; and
FIG. 6 is a detail view of the inside portion of the cover or cover plate of FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a chain saw 10 including the usual frame 11 having a motor 12 (which, in the illustrated embodiment, is a gasoline motor) mounted thereon. The saw is provided with conventional handles 15 and 16 fixed to the motor and frame. The frame includes a flat quadrilateral plate portion 17 which is bordered on two sides by a guard 18, the guard 18 being in the form of a flange which projects perpendicularly relative to the plate portion 17 and protects the user's hands and body from the moving chain 20.

A blade or bar 21 is provided for supporting the chain 20 and is mounted upon the frame 11 by means of a pair of spaced studs 22. The studs 22 are threaded perpendicularly from the flat frame portion 17. The cover plate 25 is fixed in position upon the studs 22 by nuts 23 whereby the cover plate protects the user's hands and body from the moving chain 20. The blade 21 is provided with an elongated slot 26 through which the studs 22 project. the studs project through suitable bores 27 in the cover 25 and extend through a ribbed portion 30 on the back cover plate as illustrated in FIG. 6. Received between the studs 22 is the spacer 31 of the present invention.

As best illustrated in FIG. 3, the spacer 31 has a thickness which is greater than the blade 21. Consequently, when the nuts 23 are tightly threaded up against the cover plate, the cover plate is still held in sufficiently spaced relation relative to the frame 11 to permit reciprocation of the blade 21 upon the studs. The present invention is adapted so as to be usable in a number of chain saws of varying makes and sizes. At the distal end of the blade 21, there is provided a pulley upon which the chain rides. The chain is driven by a drive sprocket 35 rotatably mounted upon a frame and driven by the motor 12.

The improved spacer of the present invention, as the spacer of Patent 3,194,284, uses the concept of maintaining a spring tension against the blade 21 to urge it away from the drive sprocket 35 and to maintain the chain tight. The present invention also includes the concept of providing adjustment means for adjusting the spring action in order that the chain tension can be adjusted to a desired value. This concept is embodied in the structure primarily illustrated in FIGS. 2 and 6.

Referring to FIG. 6, the ribbed portion 30 defines a recess 36 which opens inwardly and receives a screw 37.

Screw 37 extends generally parallel to the slot 26 into the direction of reciprocation of the bar 21. The screw 37 also extends through coaxial apertures 40 in the ribbed portion 30 and bears against the abutment surface 41 on the ribbed portion. A nut 42 having an external polygonal shape is threadedly received upon the screw 37 and, when the screw is rotated, engages the walls 45 of the recess 36 so as to prevent rotation of the nut, whereby the nut moves longitudinally of the screw. Also received upon the screw 37 but loosely reciprocal thereon is a lug member 46 which is generally cylindrical but has a projecting lug 47 integral therewith. The lug 47 projects perpendicularly relative to the plate 21 into a suitable aperture 50 through the plate. The suitable aperture has the same configuration, that is, cylindrical, as the lug 47.

Received upon the screw 37, between the nut 42 and the lug 46, is a coil spring 51. The screw 37 has an enlarged headed end 52 with conventional screw driver engageable slot 55 therein. It will be noted that when the cover plate 25 is assembled upon the saw as in FIG. 1, the head 52 of the screw is easily accessible to a screw driver. When the chain saw is assembled, the lug 47 bears against the aperture 50 of the bar urging the bar toward its distal end. The studs 22 act as guide means determining the direction of reciprocation of the blade 21. The force tending to hold the blade against the chain and to hold the chain taut is exerted from the frame to the cover plate which is fixed to the frame through the abutment surface 41 which bears against the head 42 of the screw through the screw through the nut 42 which is retained aganst longitudinal movement on the screw by the threads through the spring 51 and then to the lug member 46. It can be appreciated that the spring force, acting against the blade and tending to hold the chain taut, can be adjusted by rotating the screw 37 which causes the nut 42 to move longitudinally on the screw and thus to adjust the compression of the spring 51.

It will be noted in FIG. 2 that the spacer 31 is positioned between the spaced apart studs 22. The space between the stud varies according to the size and the make of the particular saws. The present invention provides a spacer 31 which is adjustable so as to be usable with a number of sizes and makes of chain saws.

As shown in FIG. 4, the spacer 31 is adjustable along its longitudinal axis. That is, the length of the spacer may be varied according to the distance between the spaced studs 22 so that a single spacer is usable with a number of chain saws of varying size and make. This substantially reduces production costs as only a single set of dies is required to produce the spacer which is usable with a number of chain saws.

It will be noted that spacer 31 comprises a first, substantially rectangular element 60 having a groove 61 along a longitudinal axis of one side thereof, and a second element 62 adapted to be slidably mounted within said grooved portion 61. Element 60 has first and second concave end walls 63. One of said concave end walls is adapted to abut against one of the studs 22, the other of said concave end walls is adapted to receive a complementary convex portion of element 62 when spacer 31 is in its normal, unexpanded state.

Element 62 has a shank 64 which interfits with groove 61 and is slidable therealong. By loosening screw 65, element 62 may be adjusted to form a unitary structure with element 61, or it may be adjusted outwardly to lengthen the spacer 31 as shown in FIG. 4. The distal end of the shank 64 terminates in a substantially C-shaped member 66 having its convex surfaces 67 adjacent one of the concave end walls 63 of element 60 and its concave surface 68 forming an end wall of the spacer, said end wall adapted to abut the other of the studs 22.

The present invention is an improvement over the spacer 31 of my U.S. Patent 3,194,284. The spacer of the present invention accomplishes all of the objects of my prior patent and has the added advantage of being usable with a chain saw having different spacing distances between the studs 22. Thus, the present invention is usable in chain saws of varying makes and sizes, as the length of the spacer may be varied according to the distance between the studs. The present invention is highly adaptable to saws now in use because it requires relatively few additional parts and uses the original bar and chain of the saw.

While the invention has been illustrated and described in detail in the drawings and the foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a chain saw including an endless toothed chain, a frame, a drive sprocket rotatably mounted on said frame and supporting said chain, a pair of spaced threaded studs fixed to said frame, a blade having an elongated slot and received on said studs with the studs projecting through said slot and a guard cover received on said studs, the improvement which comprises an adjustable spacer having a thickness greater than the thickness of said blade and received between said frame and cover and spacing said cover from said frame a sufficient distance to permit reciprocation of said blade on said studs, said spacer including:
    (a) a first, substantially rectangular element having a longitudinally extending groove along one side thereof, said first element having a first concave end adapted to abut against one of said studs;
    (b) a second element adapted to be slidably mounted within said groove of said first element; and
    (c) means for securing said first and second elements in a fixed relationship, said means being releasable to allow adjustment of the length of said spacer.

2. In a chain saw as defined in claim 1, said first element having a second concave end facing oppositely to said first concave end, said second element additionally including a shank adapted to be slidably mounted within said groove of said first element, said shank having a proximal end adjacent said first concave end of said spacer and a distal end terminating in a substantially C-shaped member having a convex surface adjacent said second concave end of said first element and a concave surface adapted to abut against the other of said studs.

3. In a chain saw as defined in claim 2, said second element additionally including an aperture for receiving said securing means, said securing means being a screw.

4. In a chain saw as defined in claim 3, said groove having tapered surfaces extending from the groove base to the groove mouth which is smaller than said base, said aperture being threaded to receive said screw, said screw bearing against said first element and holding said second element against said tapered surfaces.

References Cited

UNITED STATES PATENTS

| | | | |
|---|---|---|---|
| 909,068 | 1/1909 | Denman et al. | 33—161 |
| 3,194,284 | 7/1965 | Walker | 143—32 |

DONALD R. SCHRAN, *Primary Examiner.*